(12) United States Patent
Takahashi et al.

(10) Patent No.: US 7,421,192 B2
(45) Date of Patent: Sep. 2, 2008

(54) RECORDING/REPRODUCING APPARATUS, TRANSMITTING APPARATUS AND TRANSMITTING METHOD

(75) Inventors: Masaru Takahashi, Yokohama (JP); Daisuke Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 886 days.

(21) Appl. No.: 10/700,311

(22) Filed: Oct. 31, 2003

(65) Prior Publication Data

US 2004/0240839 A1 Dec. 2, 2004

(30) Foreign Application Priority Data

May 30, 2003 (JP) ............................. 2003-153712

(51) Int. Cl.
*H04N 7/26* (2006.01)
(52) U.S. Cl. ........................... 386/124; 386/96; 386/46; 386/125; 386/123; 386/52
(58) Field of Classification Search ................... 386/96, 386/125, 124, 46, 52, 123
See application file for complete search history.

(56) References Cited

U.S. PATENT DOCUMENTS

| | | | |
|---|---|---|---|
| 6,167,189 A * | 12/2000 | Taira et al. ..................... 386/95 |
| 6,285,826 B1 * | 9/2001 | Murase et al. ............... 386/125 |
| 6,285,828 B1 | 9/2001 | Kaoru et al. | |
| 2002/0113992 A1 * | 8/2002 | Takakura et al. ........... 358/1.15 |
| 2002/0194351 A1 * | 12/2002 | Nishimura et al. .......... 709/229 |
| 2004/0156082 A1 * | 8/2004 | Tanaka et al. ............... 358/500 |
| 2005/0005305 A1 * | 1/2005 | Shachar et al. .............. 725/131 |
| 2007/0109420 A1 * | 5/2007 | Takeshi ................. 348/211.99 |

\* cited by examiner

*Primary Examiner*—Thai Tran
*Assistant Examiner*—Helen Shibru
(74) *Attorney, Agent, or Firm*—Townsend and Townsend and Crew LLP

(57) ABSTRACT

Disclosed are an image recording/reproducing apparatus and a transmitting method which are user-friendly when transmitting image data recorded on a medium to an external device. Reproduction path information for transmitting image data edited by a user is recorded on the record medium. When transmitting, reproduction path information read from the recording medium is selected, the image data is reproduced according to the reproduction path information, and the reproduced data is transmitted to the external device. The reproduction path information includes transmitting event information such as the date and time of transmission, destination information, and information related to the signal format of the image data to be transmitted.

18 Claims, 6 Drawing Sheets

RECORDING/REPRODUCING APPARATUS, TRANSMITTING APPARATUS AND TRANSMITTING METHOD

BACKGROUND OF THE INVENTION

1. Field of the Invention

This invention relates to a recording/reproducing apparatus, a transmitting apparatus and a transmitting method, wherein it is possible to record information such as image data on a medium and transmit it to an external device.

2. Description of the Related Art

Equipment is now commercially available for recording and reproducing an image taken by a camera and stored on an optical disk as compressed digital data. By making use of the quick-access function of random-access recording media, such as a DVD-RAM, it is possible to reproduce recorded image data through a plurality of reproduction paths. Namely, reproduction can be carried out by selecting the images a user needs from among the recorded images, recording reproduction path information called a play list which defines the order of reproduction, and following that list (see U.S. Pat. No. 6,285,826 (FIG. 4), for example). With communication channels becoming wideband, such an apparatus provided with a function that could transmit a user's image data to an external apparatus through a communication channel is desirable.

BRIEF SUMMARY OF THE INVENTION

The prior art discloses a method of recording reproduction path information called a play list defining the order of reproduction on a recording medium and reproducing images according to the order set by a user. The user-friendliness during the transmission of image data through a communication channel, however, is less than desirable. Specifically, when transmitting image data recorded on a random-access recording medium through a communication channel, it is desirable for a user to be able to specify which part of the image data should be transmitted. When considering situations such as checking the transmission conditions after transmission, re-transmitting and transmitting the same image to different addresses, the contents of the transmitted image data need only be stored as they are. However, storing the transmitted image data as they are consumes large amounts of storage on the recording medium, which is not efficient. This invention provides a recording/reproducing apparatus, a transmitting apparatus and a transmitting method that are user-friendly when transmitting information such as images.

To solve the above problems, according to one aspect of the present invention, the recording/reproducing apparatus includes a recording/reproducing circuit, which records and reproduces information such as image data on a record medium, a transmitting circuit that transmits the reproduced information to an external device, and a control circuit that controls the operations of the recording/reproducing circuit and the transmitting circuit. The recording/reproducing circuit is configured to record reproduction path information of the information to be transmitted on the recording medium and to reproduce the information from the recording medium according to the reproduction path information. The transmitting circuit is configured to transmit the information according to the reproduction path information.

In one embodiment, the transmitting apparatus of this invention includes a reproducing circuit reproducing information from a recording medium, a transmitting circuit that transmits the reproduced information to an external device, and a control circuit that controls the operations of the reproducing circuit and the transmitting circuit. The reproduction path information of the information to be transmitted is recorded on the recording medium. The reproduction circuit is configured to reproduce information from the recording medium according to the reproduction path information, and the transmitting circuit is configured to transmit the information according to the reproduction path information.

In one embodiment, the transmitting method of this invention includes recording reproduction path information of the information to be transmitted on the recording medium, reproducing the information from the recording medium according to the reproduction path information, and transmitting the reproduced information to an external device. In addition, the reproduction path information includes transmitting event information such as the date and time of transmission, destination information, information regarding signal format for the information to be transmitted.

When the reproduction path information read from the recording medium is shown on a display and a user selects such reproduction path information, a message is shown asking if the information should be transmitted according to the reproduction path information selected by the user. If the user has chosen to transmit, the information according to the selected reproduction path, the information is reproduced from the recording medium and transmitted. If the user has chosen not to transmit, image data according to the selected reproduction path information is reproduced from the record medium but not transmitted.

BRIEF DESCRIPTION OF THE DRAWINGS

These and other advantages of the present invention will become more readily apparent from the following detailed description when taken in conjunction with the accompanying drawings.

DETAILED DESCRIPTION OF THE INVENTION

Figure 1:
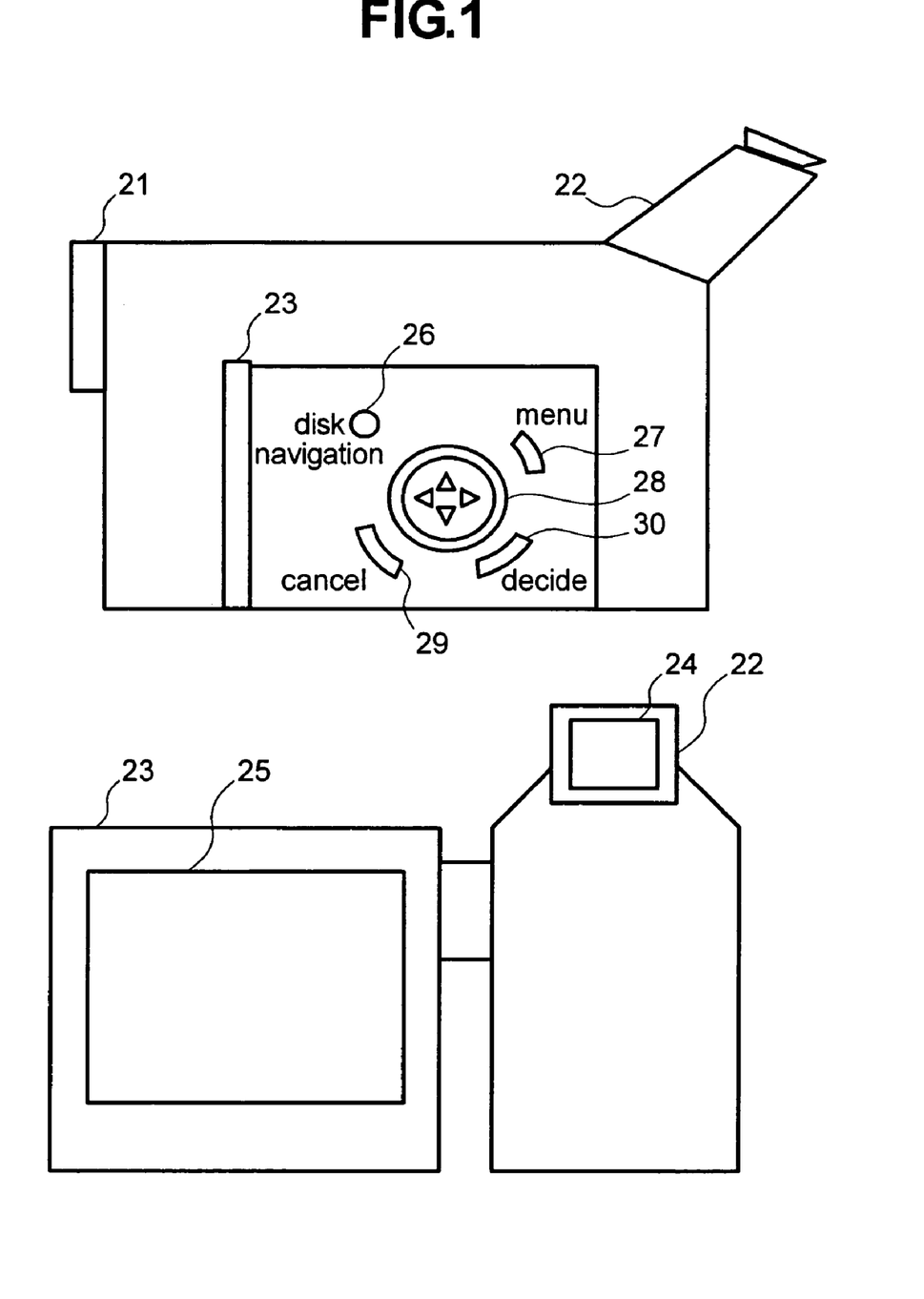
FIG. 1 shows an embodiment of the image recording/reproducing apparatus according to the present invention, showing an example applied to a video camera.

FIG. 1 is an embodiment of the image recording/reproducing apparatus according to the present invention, showing an example applied to a video camera. FIG. 1 shows an outward appearance of the video camera and an example layout of operation keys. An image taken through an optical lens 21 is displayed on a small-size LCD monitor 24 provided beside a finder 22. An LCD monitor 23 is provided, for example, with an LCD panel 25 of 2-4 inches on which an image being recorded, a reproduced image, an edit screen to be described later, a catalog of play lists, and other menu screens, etc. are displayed. Disk navigation key 26 is for switching between the display of the image being recorded and the display of images for navigation such as the edit screen and the menu screen; the screen is switched every time the key is pressed. Menu key 27 is for giving an instruction to show a pull-down menu; a display mode and a non-display mode are switched every time it is pressed. Arrow key 28 is for making various selections on the menu of images; its buttons indicate four directions (up, down, right, and left). Enter key 30 is for confirming a selected menu, a thumbnail, and so on. Cancel key 29 for deselecting a selected operation and terminating a series of operations.

Figure 2:
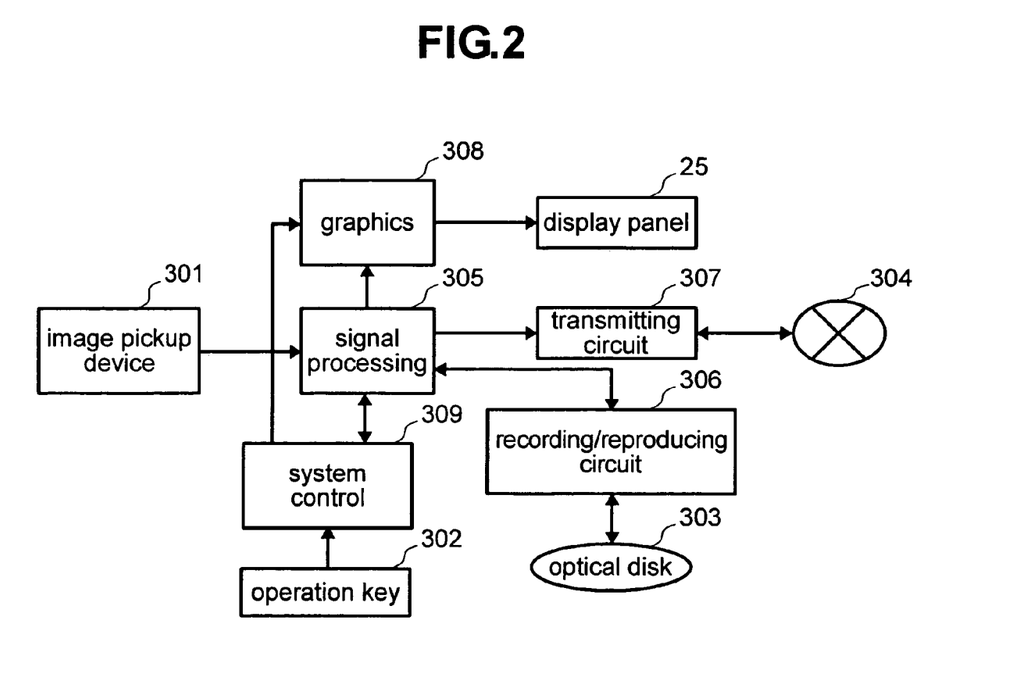
FIG. 2 shows a circuit block diagram of the video camera of FIG. 1.

FIG. 2 shows a circuit block diagram of the video camera shown in FIG. 1. A subject image obtained through an optical lens is converted into an electric signal by an image pickup device 301 such as a CCD sensor, inputted to a signal processing circuit 305, and converted into signals Y, U and V. An operation key 302 is an input means for operating the video camera and comprises various keys shown in FIG. 1. The LCD panel 25 is for displaying inputted pictures, reproduced images and a navigation screen.

In recording mode, the signal processing circuit 305 compresses image data of signals Y, U and V with a compression ratio of about 30:1, multiplexes them with voice data, and produces an MPEG-2 data stream. This MPEG-2 data stream is sent to a recording/reproducing circuit 306. The recording/reproducing circuit 306 turns the MPEG-2 data stream into data of a format compliant with the DVD standard, imparts an error-correcting code, converts it into digital data, and records it on an optical disk 303. Integrated in the recording/reproducing circuit 306 are a circuit of tracking and focusing, a spindle servo circuit for DVD optical disks, and an error-correcting circuit used when data are read or written.

The optical disk 303 may be, for example, a recording medium such as a DVD-R, a DVD-RAM, and so on. Typically, such a disk has a diameter of 8 cm, but any disks having diameters of 12 cm, 6 cm, and so on may be used. The present embodiment is described using an optical disk as the recording medium. However, a hard disk or a random-access recording medium other than disks, such as a large-capacity solid-state memory, etc. may be used. A network 304 is an external communication line connected to the video camera of this example, the main body of the video camera being connected to network 304 through wireless or cable communication.

When reproducing data, pit information is read from the optical disk 303 in a digitally modulated state, its waveform equalization and servo signals are detected by the recording/reproducing circuit 306, and outputted as an MPEG-2 stream. The MPEG-2 stream is expanded by a signal processing circuit 305 and displayed on LCD panel 25 as a reproduced image. Similarly, since an NTSC video signal is outputted from signal processing circuit 305, the image can be displayed on an external TV through a video output terminal of the camera.

A graphics circuit 308 generates character and pattern information such as a menu and an icon, and displays them on display panel 25 while superimposing them upon a displayed image outputted by signal processing circuit 305.

System control circuit 309 controls graphics circuit 308 and signal processing circuit 305 to configure a desired navigation screen according to the user's instruction inputted through operation key 302 (disk navigation function). System control circuit 309 also controls signal processing circuit 305 and recording/reproducing circuit 306 in the recording and reproducing operation. Further, it creates play list data compliant with the DVD standard according to the user's instruction inputted through operation key 302, controls signal processing circuit 305 and recording/reproducing circuit 306, and records them in a play list data storage area compliant with the DVD standard on optical disk 303 (play list registration function). Further, system control circuit 309 controls signal processing circuit 305 and recording/reproducing circuit 306 to obtain play list data from optical disk 303, and controls graphics circuit 308 to display play list information. Then, it controls signal processing circuit 305 and recording/reproducing circuit 306 so that the reproduction is carried out according to the play list selected by the user through operation key 302 (play list reproducing function).

The video camera of one embodiment includes a function of transmitting data to external network 304. When transmitting data, signal processing circuit 305, as required, converts a reproduced MPEG-2 stream sent from recording/reproducing circuit 306 into a signal format suitable for the communication. In such a case, it is appropriate to convert the stream into an MPEG-4 stream in terms of error tolerance and bit rate. Transmitting circuit 307 transmits the MPEG-4 stream to network 304. System control circuit 309 controls signal processing circuit 305, recording/reproducing circuit 306 and transmitting circuit 307 so that an image specified by the user through operation key 302 is reproduced, converted, and transmitted.

According to the video camera of the present invention, when transmitting data to external network 304, a transmitting procedure for images to be transmitted, and transmission information related to it is registered on a recording medium by creating a "transmission play list=reproduction path information." According to the created play list, or selecting from among registered play lists, the user transmits the corresponding image data. These functions are made possible when system control circuit 309 controls signal processing circuit 305, recording/reproducing circuit 306, and transmitting circuit 307, etc.

Figure 3:
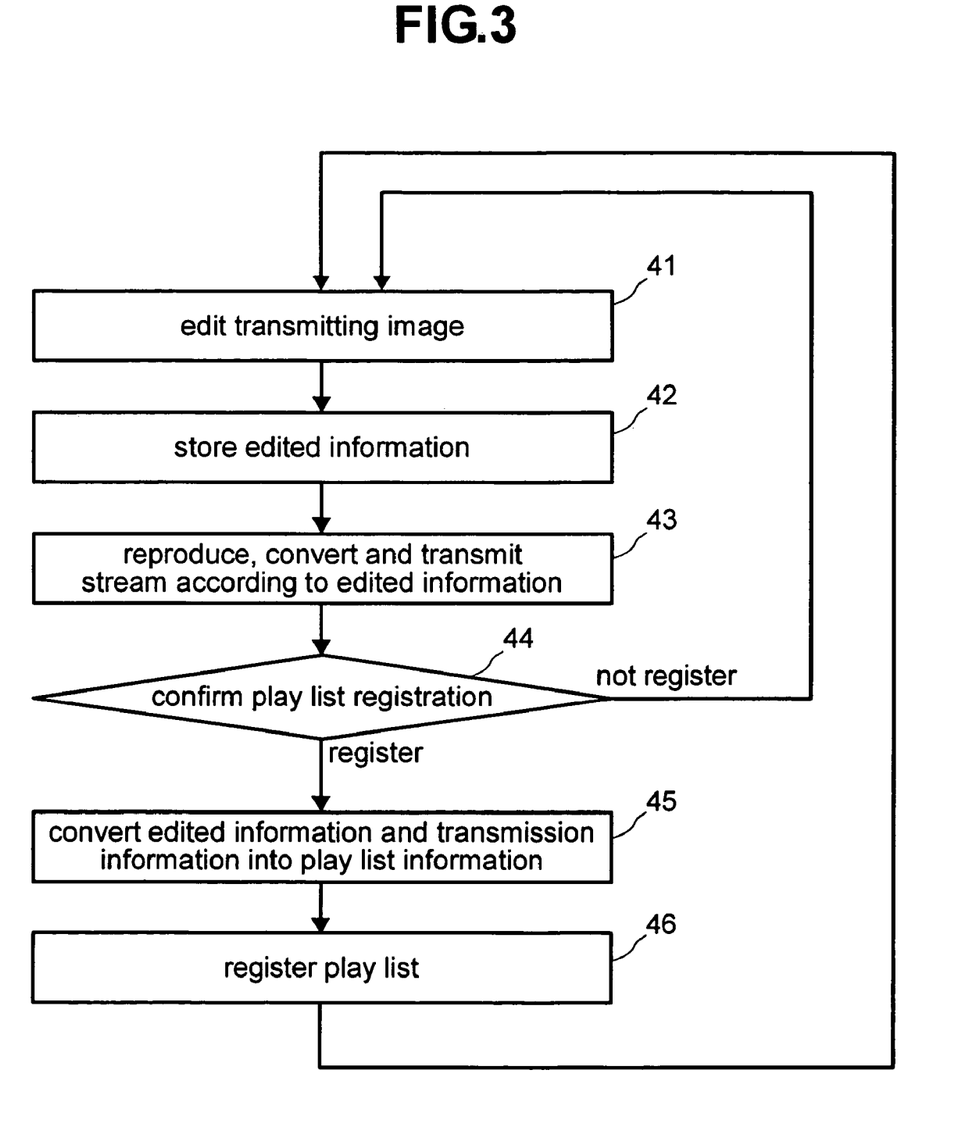
FIG. 3 shows a flowchart in which an image is transmitted using the image recording/reproducing apparatus of the present invention.

FIG. 3 shows a flowchart in which an image is transmitted using an image recording/reproducing apparatus of the present invention. In particular, a procedure for transmitting the image using a navigation screen and a procedure of registering contents to be transmitted is described. When editing images to be transmitted is instructed through operations such as menu selection by the user, a transmitting image editing screen is shown and the user editing operation is accepted on this screen (step 41).

Figure 4:
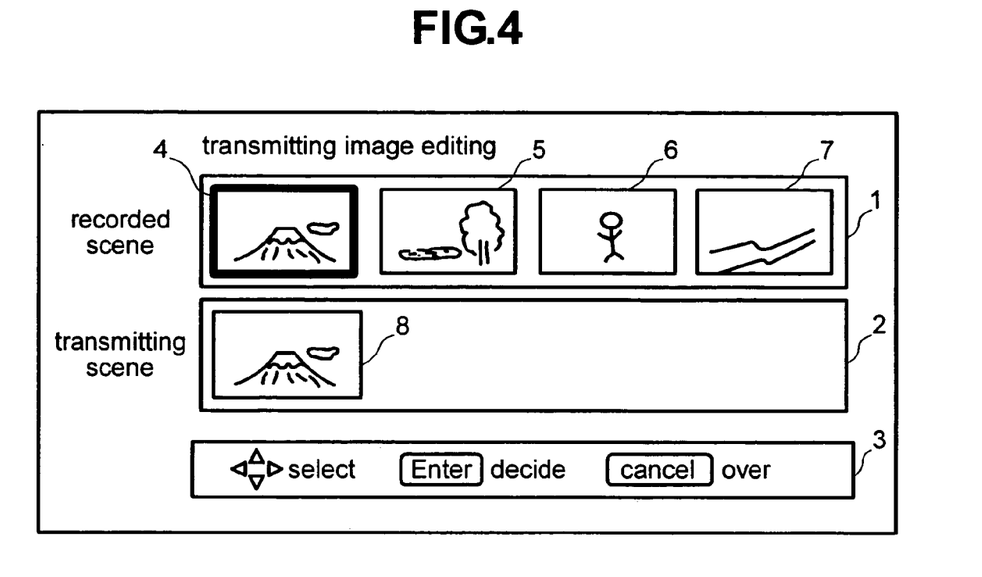
FIG. 4 shows an example of a transmitting image editing screen in step 41 of FIG. 3.

Using an example of the transmitting image editing screen of FIG. 4, step 41 is described in detail. A recorded thumbnail display area 1 is where representative images (thumbnails) of respective scenes of moving pictures recorded on optical disk 303 are shown. Thumbnails 4, 5, 6 and 7 are thumbnails of respective scenes. Each thumbnail is read from an exclusive record area for thumbnails on optical disk 303, or created by reproducing a stream, extracting a representative image, and reducing its size. An operation guide for the operating keys is shown in operation guide display area 3. By pressing arrow key 28, a cursor is moved to a thumbnail of a scene to be transmitted. A box drawn in thick lines enclosing the thumbnail is a cursor and, in the example of FIG. 4, the cursor is on thumbnail 4. When Enter key 30 is pressed after moving the cursor on a desired thumbnail, the thumbnail is copied to a transmitting thumbnail display area 2. FIG. 4 shows a state in which thumbnail 4 is selected, copied, and displayed as thumbnail 8. In this way, selected thumbnails are added sequentially to the right side of transmitting thumbnail display area 2. When cancel key 29 is pressed after a starting point and an end point of the image data to be transmitted and the thumbnail(s) to be transmitted are selected, step 41 is terminated and the process advances to the next step.

Returning to FIG. 3, the rest of the process is described. When editing of the transmitting image is over, the edited information is stored in memory. To be specific, the edited information includes scenes selected by the user on the transmitting image editing screen shown in FIG. 4 in order of their selection (step 42). Then, according to the edited information, an MPEG-2 stream is reproduced from optical disk 303, converted into an MPEG-4 stream, and transmitted to network 304 (step 43). When the transmission is over, the user is asked if the transmitting image(s) should be registered on the play list (step 44).

Figure 5:
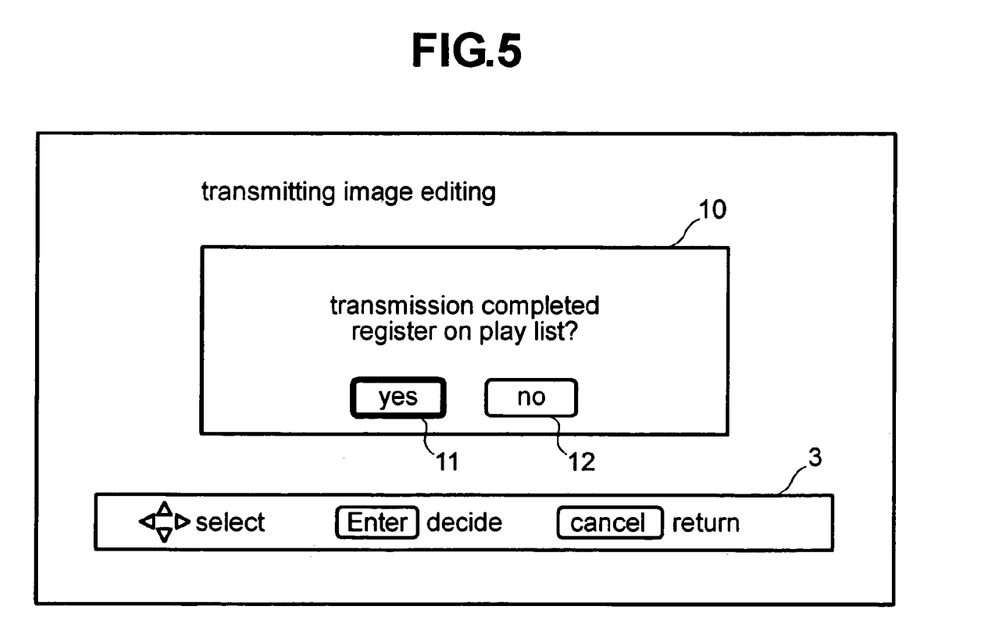
FIG. 5 shows an example of a registration confirm screen in step 44 of FIG. 3.

Next, using an example of the registration confirm screen in FIG. 5, step 44 is described in detail. When the transmission is over, a dialog box 10 is displayed and a message asking if the data should be registered on a play list is displayed in the dialog box. By pressing arrow key 28 to move the cursor, the user selects either an answer box 11 indicating 'register' or an answer box 12 indicating 'do not register.' A box drawn in thick lines in FIG. 5 is a cursor and, in this example, 'register' is selected. After the preferred answer has been selected, when enter key 30 is pressed, the answer is confirmed and the process advances to the next step.

Returning to FIG. 3, rest of the process is described. When the answer is 'do not register,' the process returns to step 41 and accepts editing of the next transmitting image. When the answer is 'register,' play list data compliant with the DVD standard is created, according to the edited information stored in step 42. Further, on this occasion, information for identifying transmission events such as the date and time of transmission, destination information, and signal format of the transmitted stream are added to play list data. These are, for example, written in the forms of titles or comments (step 45). Then, the created play list data are recorded in a play list data storage area, compliant with the DVD standard, on optical disk 303 (step 46).

When step 46 is over, the process returns to step 41 and accepts editing of the next transmitting image. Since the content to be transmitted is stored in the form of a play list according to a series of steps shown in FIG. 3, compared to a method in which transmitting data are recorded as they are on a record medium, consumption of the storage capacity of the record medium is greatly conserved. Further, by making use of the stored play list, image data can be easily reproduced and transmitted.

Further, since the play list registration confirm screen is shown and the user selects whether the list should be registered, unnecessary play lists do not have to be created. Further, by adding information for identifying transmitting events to the play list and registering it, when showing a catalog of play lists to be described later, the user can easily identify which transmitting event the play list belongs to or the transmitting conditions.

Figure 6:
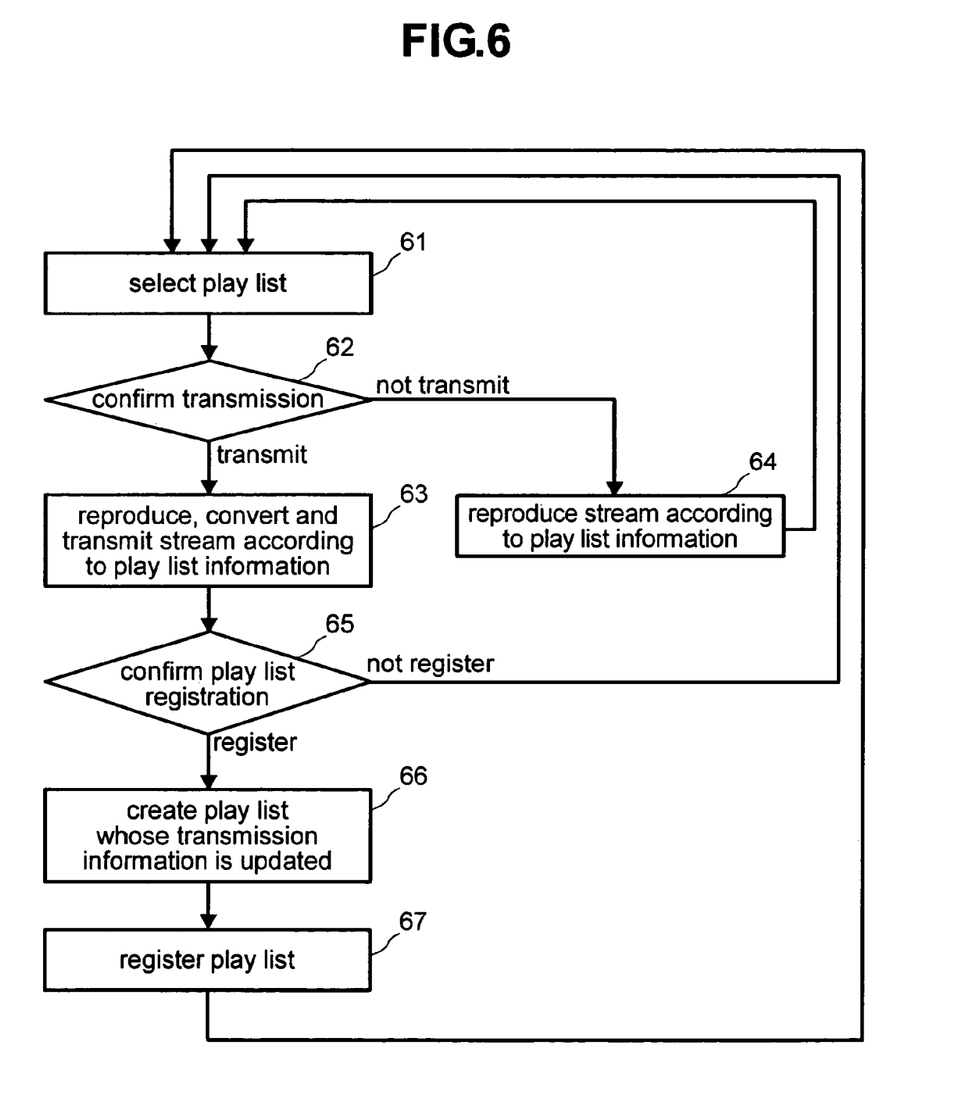
FIG. 6 shows another flowchart in which an image is transmitted using the image recording/reproducing apparatus of the present invention.

FIG. 6 shows another flowchart in which an image is transmitted using the image recording/reproducing apparatus of the present invention. In particular, a transmission procedure using a registered play list is described. First, when play list selection is instructed through an operation such as selection of a menu by the user, a screen showing a catalog of play lists is displayed, and a play list is selected by the user on this screen (step 61).

Figure 7:
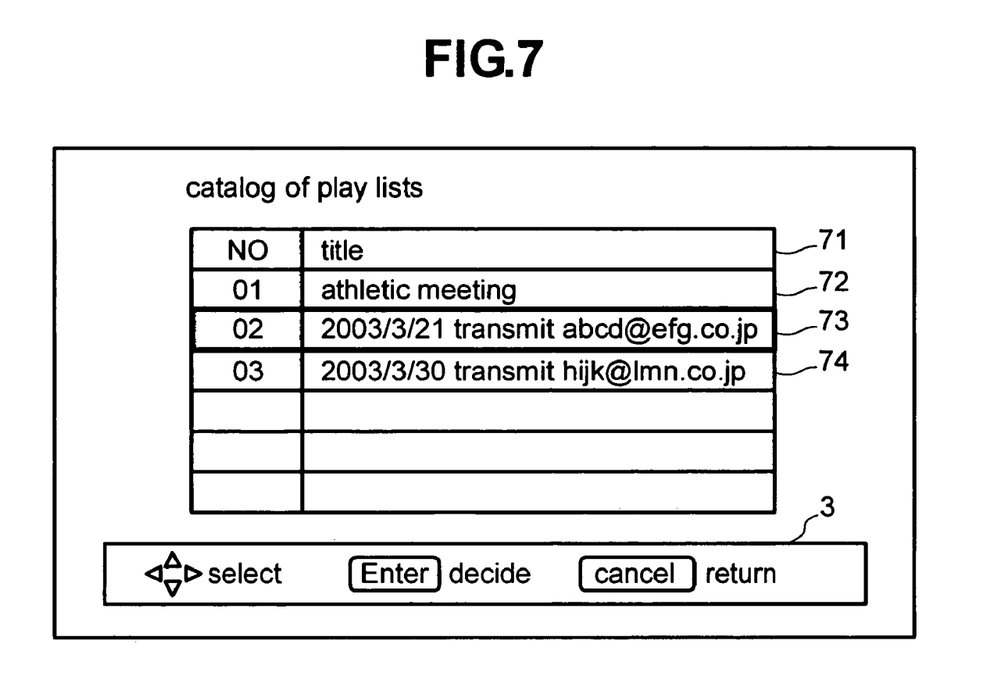
FIG. 7 shows a catalog of play lists in step 61 of FIG. 6.

Using an example of the play list catalog screen of FIG. 7, step 61 is described in detail. A play list catalog 71 is an area in which all the registered play lists are displayed. In the example of FIG. 7, play lists 72, 73 and 74 are registered and respective titles are shown. Data to be displayed are read from the play list data storage area on optical disk 303 compliant with the DVD standard. Further, in the example of FIG. 7, play lists 73 and 74 show the case when transmitting contents are registered on the play list according to a series of procedures shown in FIG. 3, showing the case when the date and time of transmission and destination information are titles of the play list. In addition, a signal format of a transmitted stream can be included there. This way, the user can see at a glance which play list is for which transmission or with which signal format the data is transmitted. By pressing arrow key 28, the user moves the cursor on a desired play list. A box drawn with thick lines is a cursor and, in the example of FIG. 7, the cursor is on play list 73. When enter key 30 is pressed after moving the cursor onto a desired play list, the selected play list is confirmed and the process advances to the next step.

Figure 8:
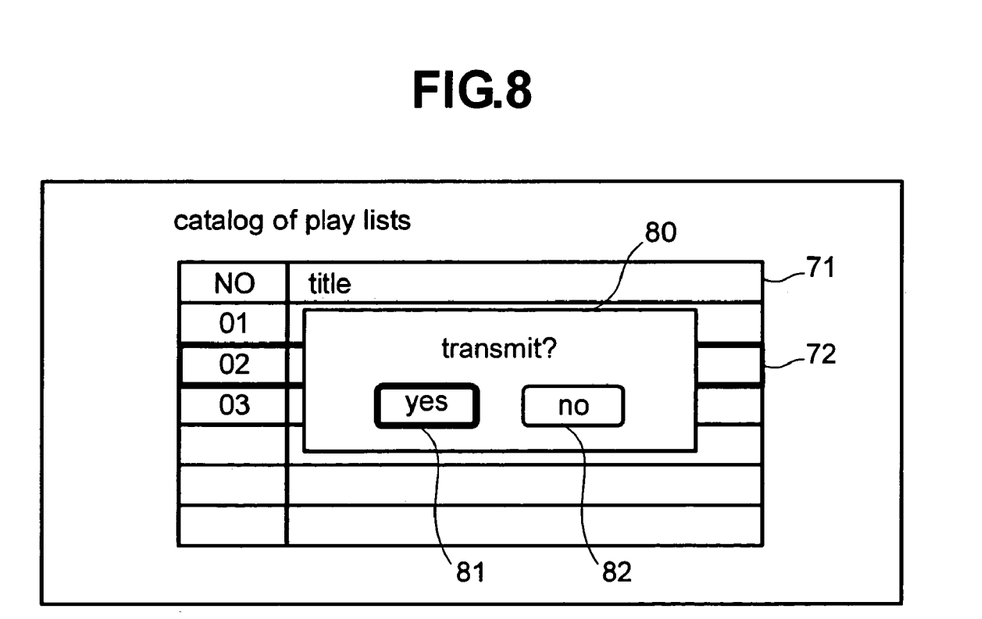
FIG. 8 shows an example of a transmission confirm screen in step 62 of FIG. 6.

Now, returning to FIG. 6, the rest of the process is described. When the play list is confirmed, the user is asked if it should be transmitted (step 62). Using an example of the transmission confirm screen of FIG. 8, step 62 is explained in detail. When a play list is selected, a dialog box 80 is shown, where a message asking if the play list should be transmitted is shown. By pressing arrow key 28 and moving the cursor, the user selects either an answer box 81 indicating 'transmit' or an answer box 82 indicating 'do not transmit.' A box drawn with thick lines in FIG. 8 is a cursor and, in this example, 'transmit' is selected. When Enter key 30 is pressed after selecting a desired answer, the answer is confirmed and the process advances to the next step.

Returning to FIG. 6, the rest of the process will be described. When the answer is 'do not transmit,' an MPEG-2 stream is reproduced from optical disk 303 according to the play list and displayed (step 64). As soon as reproduction is over, the process returns to step 61 and accepts selection of the next play list. When the answer is 'transmit,' an MPEG-2 stream is reproduced from optical disk 303 according to the play list, converted into an MPEG-4 stream, and transmitted to network 304 (step. 63).

Specifically, the present embodiment has a mode for reproducing an image only according to a play list and a mode for transmitting reproduced image data according to the play list; the user can select between these two modes. When the transmission is over, the user is asked if the contents to be transmitted should be registered on the play list. The details are the same as in step 44 (step 65).

If the answer is 'do not register,' the process returns to step 61 and accepts selection of the next play list. When the answer is 'register,' new play list data is created in which part of the reproduced play list data related to the transmitting event is renewed as the information used during transmission in step 63 (step 66). Then, the created play list data is recorded on the optical disk 303 in a play list data storage area compliant with the DVD standard (step 67). When step 67 is over, the process returns to step 61 and accepts selection of the next play list.

Through a series of steps shown in FIG. 6, image data according to a play list created in advance can be easily transmitted. In particular, it is advantageous when transmitting the same image as the one transmitted before. Even when the quality of the image transmitted previously is deteriorated, since the signal format information that was used is preserved, measures can be taken to convert the image into another signal format giving priority to the image quality and transmitted again.

In the above embodiments, the case when image data is transmitted from a video camera to an external device has been discussed. However, the present invention can be applied to cases when transmitting not only image data but also any information such as voice data and character data. Further, the apparatus from which information is transmitted may be not only a video camera but also any recording/reproducing apparatus and transmitting apparatus reproducing information from a medium and transmitting such information. According to the present invention, a recording/reproducing apparatus, a transmitting apparatus and a transmitting method which are user-friendly when transmitting information can be provided.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and the range of equivalency of the claims is therefore intended to be embraced therein.

What is claimed is:

1. A recording/reproducing apparatus capable of transmitting information recorded on a record medium to an external device, comprising:
    a recording/reproducing circuit which records information on and reproduces information from the record medium;
    a first transmitting circuit which transmits the information to a display;
    a second transmitting circuit which transmits the information to the external device via an external network to which other external devices are connected; and
    a control circuit which controls workings of said recording/reproducing circuit and said first and second transmitting circuits;
    wherein said recording/reproducing circuit records multiple instances of path information, each instance of path information including order information defining an order of information to be transmitted to said external device by said second transmitting circuit and destination information, corresponding to the order information, which is used when the information to be transmitted is transmitted to the external device among the other external devices, on said record medium, and reproduces the information from said record medium according to the order information included in an instance of the path information, and
    wherein said second transmitting circuit transmits the information reproduced by the recording/reproducing circuit, according to the order information included in an instance of the path information, to said external device using the corresponding destination information included in the same instance of path information.

2. A recording/reproducing apparatus according to claim 1, wherein the recording/reproducing apparatus comprises a signal conversion circuit which converts the signal format of the reproduced information into another signal format so as to be transmitted to the external device.

3. A recording/reproducing apparatus according to claim 1, wherein said reproduction path information includes transmitting event information such as the date and time of transmission, and information related to a signal format of the information to be transmitted.

4. A recording/reproducing apparatus according to claim 1, wherein the recording/reproducing apparatus has a display section on which said path information is set and displayed,
    creates said reproduction path information using the display section from the information to be transmitted specified by a user,
    the user selects path information corresponding to the information to be transmitted from among the path information displayed on the display section,
    and said second transmitting circuit transmits information according to the selected path information.

5. A recording/reproducing apparatus according to claim 4, wherein the recording/reproducing apparatus displays a message on said display section asking if the information to be transmitted specified by said user should be recorded on said record medium as path information,
    records the path information on the record medium when the user has chosen to record it as path information,
    and does not record the path information on the record medium when the user has chosen not to record it as path information.

6. A recording/reproducing apparatus according to claim 4, wherein the recording/reproducing apparatus displays reproduction path information read from said record medium on said display section,
    displays a message, when the user has selected path information, asking if information should be transmitted according to the path information selected by the user,
    reproduces information according to the selected path information from the record medium and transmits it via said second transmitting circuit, when the user has chosen to transmit,
    and reproduces information according to the selected path information from the record medium but does not transmit it via said second transmitting circuit, when the user has chosen not to transmit.

7. A recording/reproducing apparatus according to claim 1, wherein said information is image data.

8. A transmitting apparatus transmitting information recorded on a record medium to an external device, comprising:
    a reproducing circuit which reproduces information from the record medium;
    a first transmitting circuit which transmits the information to a display;
    a second transmitting circuit which transmits the reproduced information to the external device via an external network to which other external devices are connected; and
    a control circuit which controls workings of said reproducing circuit and said first and second transmitting circuits;
    wherein a plurality of instances of path information, each of the instances of path information including order information defining an order for the information to be transmitted, and destination information, corresponding to the order information, which is used when the information to be transmitted is transmitted to the external device among the other external devices, is recorded on said record medium, said reproducing circuit reproduces information from said record medium according to the order information included in an instance of the path information, and said second transmitting circuit transmits the information reproduced by the reproducing circuit, according to the order information included in an instance of the path information, to the external device using the corresponding destination information included in the same instance of path information.

9. A transmitting apparatus according to claim 8, wherein said path information includes transmitting event information such as the date and time of transmission, and information related to a signal format of the information to be transmitted.

10. A transmitting apparatus according to claim 8, wherein said information is image data.

11. A transmitting method for transmitting information recorded on a record medium to an external device, comprising the steps of:

recording a plurality of instances of path information, each instance of path information including order information defining an order of the information to be transmitted to the external device, and destination information, corresponding to the order information, which is used when the information to be transmitted is transmitted to the external device among other external devices, on said record medium;

reproducing information corresponding to said path information from said record medium according to the order information contained in an instance of the path information;

transmitting said reproduced information to a display section; and transmitting said reproduced information to said external device using the corresponding destination information included in an instance of path information according to the corresponding order information included in the same instance of path information via an external network to which the other external devices are connected.

12. A transmitting method according to claim 11, wherein said reproduced information is converted into another signal format and transmitted.

13. A transmitting method according to claim 11, wherein said path information includes transmitting event information such as the date and time of transmission, and information related to a signal format of the information to be transmitted.

14. A transmitting method according to claim 11 including a step for setting and displaying said path information on the display section, wherein said path information is created using the display section from the information to be transmitted specified by the user, the user selects path information corresponding to the information to be transmitted from the path information displayed on the display section, and the corresponding information is transmitted according to said selected path information.

15. A transmission method according to claim 14, wherein a message is displayed on said display section asking if said information to be transmitted specified by the user should be recorded on said record medium as path information, the path information is recorded on the record medium when the user has chosen to record it as the path information, and the path information is not recorded on the record medium when the user has chosen not to record it as the path information.

16. A transmitting method according to claim 14, wherein path information read from said record medium is displayed on said display section, a message, asking if information should be transmitted according to the path information selected by the user, is displayed, when the user has selected path information, information according to the selected path information is reproduced from the record medium and transmitted, when the user has chosen to transmit, and information according to the selected path information is reproduced from the record medium but not transmitted, when the user has chosen not to transmit.

17. A transmitting method transmitting information recorded on a record medium to an external device, wherein a plurality of instances of path information each include order information defining an order of the information to be transmitted to the external device, and destination information, corresponding to the order information, which is used when the information to be transmitted is transmitted to the external device among other external devices, is recorded on said record medium, comprising the steps of:

reproducing information from said record medium according to the order information contained in the path information;

transmitting said reproduced information to a display section; and transmitting said reproduced information to said external device using the destination information included in an instance of the path information according to the corresponding order information included in the same instance of path information via an external network to which the other external devices are connected.

18. A transmitting method according to claim 11, wherein said information is image data.

* * * * *